United States Patent [19]

Maul

[11] Patent Number: 5,504,620

[45] Date of Patent: Apr. 2, 1996

[54] DEVICE FOR DIVIDING AN OPTICAL BEAM

[75] Inventor: Manfred Maul, Sulzbach, Germany

[73] Assignee: Linotype-Hell AG, Eschborn, Germany

[21] Appl. No.: 50,219

[22] PCT Filed: Jul. 30, 1992

[86] PCT No.: PCT/DE92/00624

§ 371 Date: Jul. 16, 1993

§ 102(e) Date: Jul. 16, 1993

[87] PCT Pub. No.: WO93/05427

PCT Pub. Date: Mar. 18, 1993

[30] Foreign Application Priority Data

Aug. 28, 1991 [DE] Germany .................. 41 28 469.0

[51] Int. Cl.$^6$ .................. G02B 5/30; G02B 27/28
[52] U.S. Cl. .................. 359/496; 359/495; 359/497
[58] Field of Search .................. 359/495, 496, 359/497, 833, 834

[56] References Cited

U.S. PATENT DOCUMENTS

| | | | |
|---|---|---|---|
| 2,449,287 | 9/1948 | Flood | 359/495 |
| 2,787,187 | 4/1957 | Rantsly | 359/834 |
| 3,510,198 | 5/1970 | Pale | 359/495 |
| 3,704,061 | 11/1972 | Travis | 350/171 |
| 3,905,684 | 9/1975 | Cook et al. | 359/834 |
| 4,009,941 | 3/1977 | Verdijk et al. | 350/173 |
| 4,072,405 | 2/1978 | Ozeki | 350/173 |
| 4,161,349 | 6/1979 | Norman | 359/834 |
| 4,406,520 | 9/1983 | Sato | 350/173 |
| 4,502,783 | 3/1985 | Lau et al. | 359/496 |
| 4,595,957 | 6/1986 | Holthusen | 358/290 |
| 4,878,720 | 11/1989 | Hanke et al. | 350/6.4 |
| 4,907,858 | 3/1990 | Hara et al. | 350/286 |
| 4,917,457 | 4/1990 | Iizuka | 359/833 |
| 4,936,643 | 6/1990 | Beiser | 350/6.5 |
| 5,011,245 | 4/1991 | Gibbs | 350/6.5 |
| 5,124,841 | 6/1992 | Oishi | 359/496 |
| 5,245,472 | 9/1993 | Hegg | 359/496 |
| 5,295,018 | 3/1994 | Konuma et al. | 359/496 |
| 5,325,175 | 6/1994 | Mocker et al. | 359/496 |

FOREIGN PATENT DOCUMENTS

| | | | |
|---|---|---|---|
| 0354028A1 | 2/1990 | European Pat. Off. | G11B 7/00 |
| 3918075 | 10/1990 | Germany | G02B 27/10 |
| 1482668 | 8/1977 | United Kingdom | G11B 25/02 |
| 2151066 | 7/1985 | United Kingdom | G11B 7/08 |

OTHER PUBLICATIONS

Patent Abstracts of Japan, vol. 3, No. 124 (E–144), Oct. 17, 1979.

Patent Abstracts of Japan, vol. 13, No. 460, Oct. 18, 1989, "Optical Path Separating Optical System", Masaharu Suzuki.

*Primary Examiner*—Georgia Y. Epps
*Assistant Examiner*—Michael A. Papalas
*Attorney, Agent, or Firm*—Hill, Steadman & Simpson

[57] ABSTRACT

An optical beam-dividing device divides an optical beam into first and second sub-beams. A first prism has an entry face for an optical beam incident thereon. A first exit face is provided at which the first sub-beam exits. A second prism is provided adjoining the first prism at a first optical beam splitter. The second prism has a second exit face at which the second sub-beam exits. A third prism adjoins the second prism at a second optical beam splitter. The third prism has a reflection face opposite the second splitter. The second exit face has a third optical beam splitter thereat. The reflection face has a mirror aligned substantially perpendicular relative to the optical axis and has a circular-to-linear optical beam converter thereat. The various parts of the device are geometrically positioned relative to one another so that the optical beam entering the entry face is split into the first and second sub-beams for exiting from opposite sides of the device and so that each sub-beam undergoes an even number of reflections.

20 Claims, 6 Drawing Sheets

DEVICE FOR DIVIDING AN OPTICAL BEAM

BACKGROUND OF THE INVENTION

The invention is directed to a device for dividing an optical beam that is composed of at least one prism and comprises an entry face, a reflection face as well as two exit faces.

EP-A-0 354 028, corresponding to U.S. Pat. No. 5,011,245, discloses such a device. The device is employed therein in an inside drum recording means, whereby a recording material to be exposed is arranged in a stationary inside drum fashioned like a cylindrical segment. The sub-beams can be aligned with the rotating prism recited in this publication such that they have an offset of approximately 180°. As a result thereof, two lines of the recording material can be exposed per revolution of the prism, as a result whereof the recording speed is increased. The device, however, has the disadvantage that the angular wobble of the rotating prism that is caused by tolerances in the region of the bearing unit for the prism is doubled and the recording quality is thereby substantially diminished.

Another device comprising a prism for deflecting a light beam is disclosed by DE-C-39 18 075. In this device, the angular wobble is in fact reduced but only one light beam is produced, so that respectively only one line on the recording material can be exposed during a revolution of the prism.

EP-B-0 126 469, corresponding to U.S. Pat. No. 4,595,957, discloses another inside drum recording means, whereby a light beam is deflected across the recording material with a single mirror. The employment of a single mirror has the disadvantage that the angular wobble is likewise doubled and only one line on the recording material can be exposed per mirror revolution.

WO 90/15355, corresponding to U.S. Pat. No. 4,936,643, discloses another device for-beam deflection in an inside drum recording means. In order to avoid the influences of disturbances, two reflection faces are arranged therein in the region of a rotating shaft. The first reflection face, which faces toward a light source, deflects the light beam in the direction onto the second reflection face, which aligns the light beam onto a recording material. This device has the disadvantage that only a single line can again be exposed on the recording material per revolution. The angular wobble is completely suppressed in this device.

U.S. Pat. No. 4,878,720 recites various prism shapes that completely suppress angular wobble and do not allow two sub-beams to be produced.

It is not possible with the assistance of the known devices to realize a beam splitter such that it is constructed in a structurally simple way and also guarantees a qualitatively high-grade beam transmission. In particular, the known devices are not in the position to adequately undertake a reduction of an angular wobble.

SUMMARY OF THE INVENTION

It is therefore an object of the present invention to improve a device for dividing an optical beam such that a qualitatively high-grade beam division is achieved while guaranteeing a compact arrangement.

This object is inventively achieved in that the entrance face is arranged in the region of an entrance prism that adjoins an exit prism in whose region one of the exit faces is arranged; in that the reflection face is arranged in the region of a terminating prism that adjoins the exit prism; and in that the second exit face is provided in the region of the entrance prism.

Advantageously, two sub-beams for faster illumination of the recording material can be generated and a prescribable reduction of the wobble error can be simultaneously achieved with the device of the invention. Since the optical paths of the sub-beams are of equal length, it is adequate to provide only one focusing lens in front of the entry face of the beam splitter. As a result of the possibility of prescribing the reduction of the angular wobble, this can be suppressed to such an extent that a qualitative deterioration of the beam path does not occur and an adequate angular sensitivity for compensating angular errors and/or integration errors of the beam splitter by tilting is nonetheless enabled.

An error source that could lead to a dyadic periodic variation of the track spacing given a track-by-track exposure of a recording material is thereby reduced. Such a change of the track spacing is disadvantageous, particularly given raster exposures.

A suitable shaping of the sub-prisms makes it possible to allow the sub-beams to emerge such that their exit points in the region of the exit faces lie exactly opposite one another with respect to the rotational axis of the device. The exit angle is therefore also the same, and changes of the radius of the inside drum have no influence on the track spacing.

An even number of reflections in every sub-beam path assures that adjustment and manufacturing errors of the focusing lens as well as of scanner elements employed for the optical acquisition of originals act identically in both sub-beams. In detail, thus, an offset of the optical axis relative to the rotational axis, an angle between the optical axis and the rotational axis, as well as an angular wobble of the rotational axis or a radial or, respectively, axial run-out of the rotational axis of the prism influence the two sub-beams identically. What results therefrom is that deviations of the point of incidence of the beam in an image plane with respect to a provided nominal position in fact occur. However, these deviations are identical for both sub-beams, and dyadic periodic changes in track spacing are avoided as a result thereof.

According to a preferred embodiment of the invention, it is proposed that a circular-to-linear converter is arranged in the region of the entrance face. As a result thereof, it is possible to design the beam splitter as a polarization divider and to provide both transmission as well as reflection surfaces whose optical behavior is dependent on a respective polarization of the optical beam. As a result thereof, a comparatively great latitude for designing the beam splitter becomes available and a compact embodiment is enabled.

According to another preferred embodiment, it is provided that a splitter designed as a boundary surface is arranged between the entrance prism and the exit prism, this splitter having an alignment of approximately −45° relative to the entry direction of the beam, in that a second splitter is arranged in the region of the transition from the exit prism to the terminating prism, this second splitter having an inclination of approximately 67.5° relative to the light entry direction; and in that the exit face arranged in the region of the exit prism has an angle of inclination of approximately 22.5° relative to the light entry direction. This geometric arrangement of the faces makes it possible to realize symmetrical exit conditions.

It is proposed according to another preferred embodiment that the exit face of the entry prism has an alignment that extends essentially parallel to the light entry direction; and that the second exit face is arranged at a wedge that is located in the region of the exit prism and lends the exit face an orientation that is likewise arranged essentially parallel to the light entry direction. As a result of such a design, it is possible for special applications to completely suppress an angular wobble of the bearing. The exit faces are aligned exactly perpendicularly relative to the exit directions of the sub-beams. What results therefrom is that a refraction in the region of the exit faces is avoided.

Further details of the present invention derive from the following, detailed description and from the attached drawings wherein preferred embodiments of the invention are illustrated by way of example.

DESCRIPTION OF THE PREFERRED EMBODIMENTS

For illustrating the polarization conditions, the respective beam components of a perpendicular, linear polarization are identified in the figures with a double arrow perpendicular relative to the respective beam direction (s-polarized beam components). The beam components having a linear polarization rotated by 90° (p-polarized beam components) are then marked by a point surrounded by a circle, whereas a circular polarization is indicated by a circular arrow.

Figure 1:
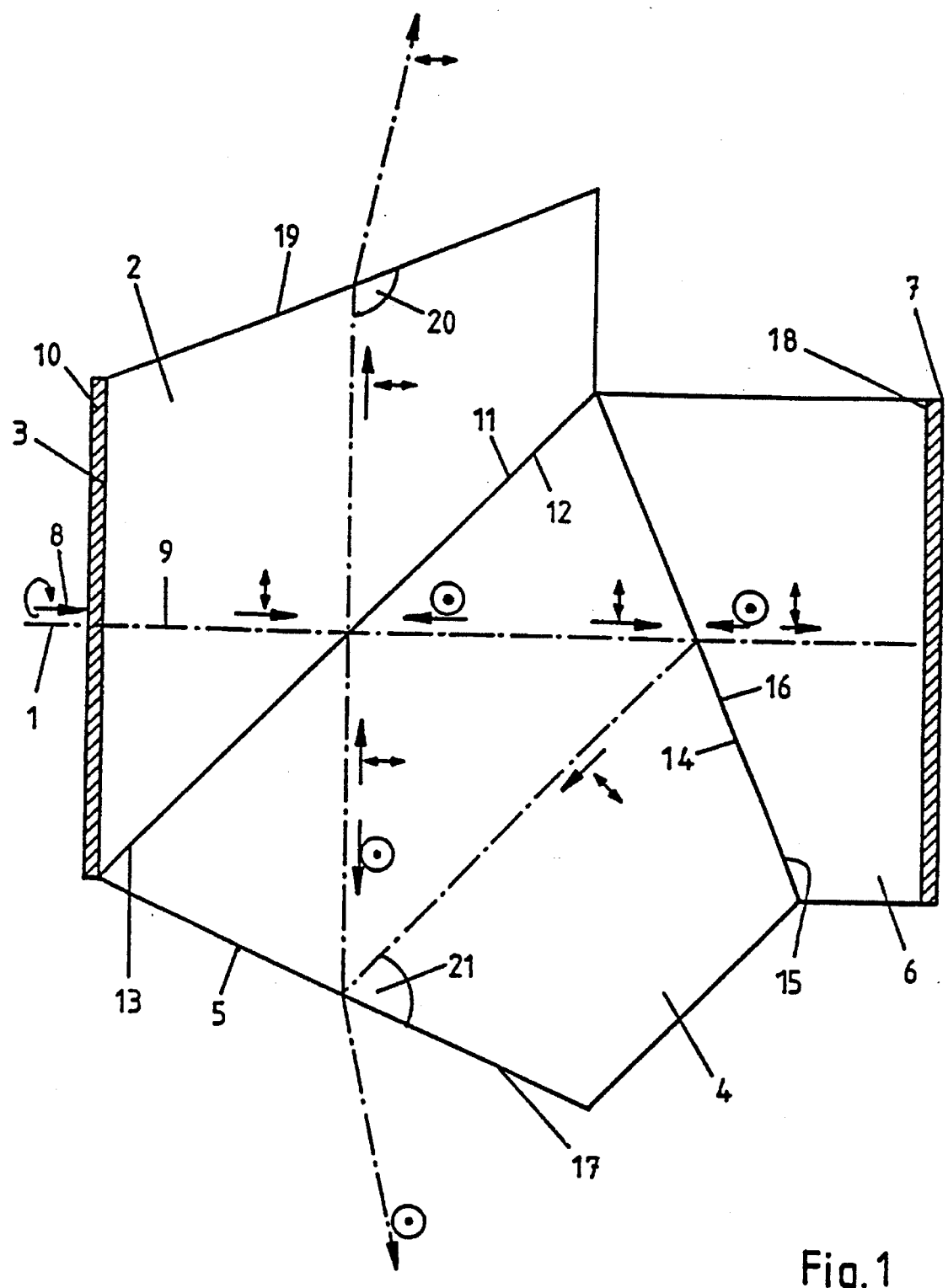
FIG. 1 is a plan view onto a rotatably seated beam slitter that is composed of an entry prism, of an exit prism as well as of a terminating prism in whose region a reflection face is arranged.

The beam splitter of FIG. 1 for an optical beam 1 is essentially composed of an entry prism 2 that is provided with an entry face 3, of an exit prism 4 that has an exit face 5, as well as of a terminating prism 6 in which a reflection face 7 is arranged. In the embodiment of FIG. 1, the entry face 3 is arranged essentially perpendicularly relative to an entry direction 8 of the optical beam 1. A rotational axis 9 around which the rotatably seated device rotates comprises essentially the same orientation as the entry direction 8. A circular-to-linear converter 10 that can be designed as a λ/4 plate is arranged in the region of the entry face 7. The entry prism 2 comprises a boundary surface 11 that extends essentially parallel to a boundary surface 12 of the exit prism 4 and erects an angle of approximately −45° relative to the entry direction 8. The boundary surfaces 11, 12 are executed such that they form a splitter 13 that completely transmits linearly spolarized light. The optical beam 1 proceeding into the circular-to-linear converter 10 is initially circularly polarized and can be supplied to the circular-to-linear converter 10 via a focusing lens. A transformation of the optical beam 1 into a linearly s-polarized beam that is essentially allowed to pass by the polarization-selective splitter 13 occurs in the circular-to-linear converter 10.

A second splitter 15 is arranged in the region of a boundary surface 14 of the exit prism 4 facing toward the terminating prism 6, this second splitter 15 being essentially formed of the boundary surface 14 as well as of a boundary surface 16 of the terminating prism 6 that extends essentially parallel to the boundary surface 14. The splitter 15 has an inclination of approximately 67.5° relative to the entry direction 8 and transmits approximately 62% of the incident beam into the terminating prism 6 and reflects approximately 38% of the incident beam in the direction onto a splitter 17 that has a polarization-selective property and is arranged in the region of the exit face 5.

The reflection face 7 extends essentially perpendicularly relative to the entry direction 8 and can, for example, be designed as a metallic mirror. In particular, it has been envisioned to arrange a second circular-to-linear converter 18 between the terminating prism 6 and the reflection face 7, this second circular-to-linear converter 18 being likewise capable of being designed expediently as a λ/4 plate. The optical beam 1 passes through this circular-tolinear converter 18 both on its path in the direction nto the reflection face 7 as well as on its return path. A rotation of the polarization direction by 90° results therefrom.

The exit face 5 has an inclination of approximately 22.5° relative to the entry direction 8. An exit face 19 arranged in the region of the entry prism 2 likewise comprises an inclination of approximately −22.5° relative to the entry direction 8. Over and above this, the exit face 19 is symmetrically arranged with respect to the exit face 5 relative to the rotational axis 9. The beam reflected by the reflection face 7 is again 62% transmitted when it again impinges the splitter 15, so that the transmitted sub-beam has a light part of approximately 38% relative to the original light power.

Figure 2:
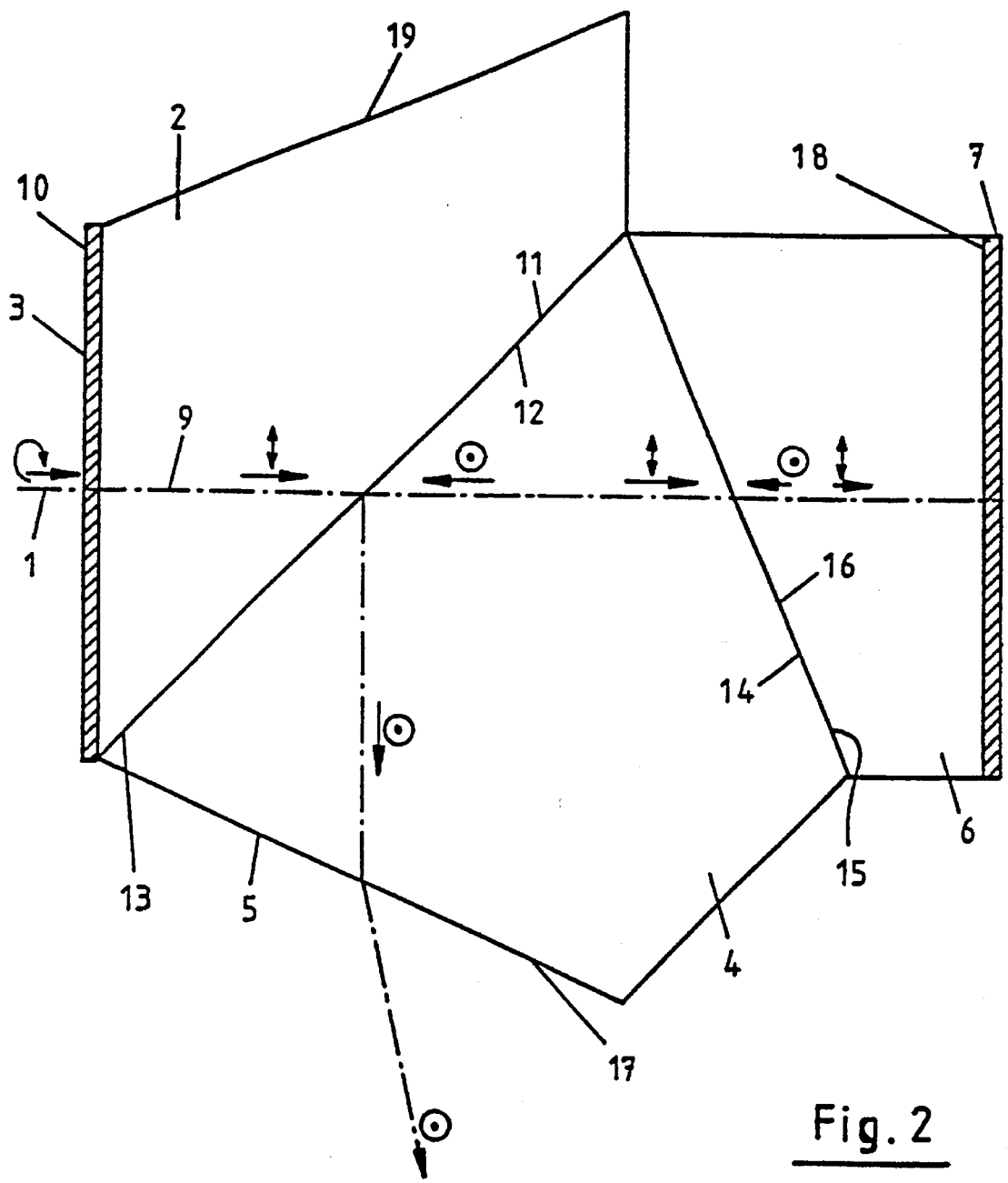
FIG. 2 is a plan view onto the prism of FIG. 1 wherein only the beam path for one sub-beam is entered.

The illustration of FIG. 2 shows what path a first sub-beam takes within the prism. The optical beam 1 proceeding via the entry face 3 into the entry prism is first completely transmitted in the splitter 13 into the exit prism 4 and a portion of approximately 62% thereof is allowed to pass into the terminating prism 6 by the splitter 15. After reflection at the reflection face 7 and a rotation of the polarization direction by 90°, a transmission with approximately 62% occurs in the splitter 15 into the exit prism 4 and the first, now linearly p-polarized sub-beam is reflected in the direction onto the exit face 5 in the splitter 13. The linearly p-polarized, first sub-beam passes through the polarization-selective splitter 17. A refraction of the emerging, first sub-beam occurs in the exit face 5.

Figure 3:
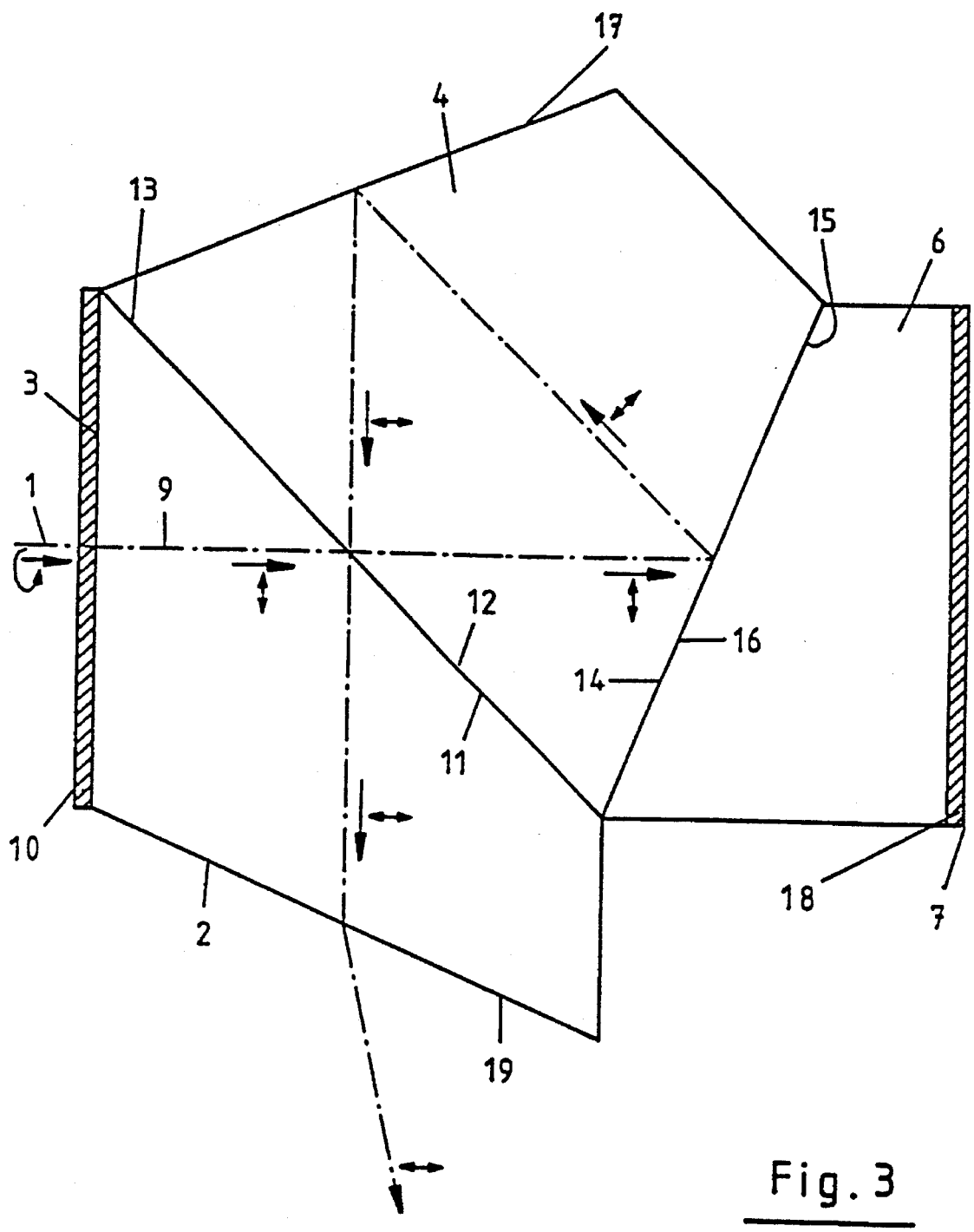
FIG. 3 is an illustration of the prism of FIG. 1 rotated by 180° wherein the beam path for the other sub-beam is indicated.

In the illustration of FIG. 3, the prism is turned by 180° with respect to the rotational axis 9 relative to the illustration in FIG. 2. The second sub-beam departing the prism through the exit face 19 has exactly the same orientation as the first sub-beam emerging from the exit face 5 in the illustration in FIG. 2. Particularly given exposure of recording materials in inside drum recording means, qualitatively high-grade recordings can thereby be achieved. In this illustration, too, the optical beam 1 first passes through the splitter 13, and the part reflected by the splitter 15 forms a second sub-beam that continues to be s-polarized. This proceeds into the polarization-selective splitter 17 wherein a renewed reflection in the direction onto the exit face 19 occurs. On its path from the splitter 17 to the exit face 19, the second sub-beam which continues to be linearly s-polarized passes through the splitter 13 without, however, being significantly influenced by the latter. As a consequence of the reflection proportions that have been realized as well as of the dimensioning of the respective component parts, the sub-beams that are coupled out at the exit face 5 on the one hand and at the exit face 19 on the other hand have both an identical intensity as well as identical running paths through the prisms 2, 4, 6. As a result thereof, variations in the light intensity and in the light quality of the sub-beams can be avoided.

The splitter 15 fundamentally has the function of reflecting a fixed proportion of the beam 1 coming from the entry face 3 of the entry prism 2 as well as transmitting the same proportion of the optical beam 1 upon double passage therethrough, whereby the polarization direction is inventively rotated by 90° between the two passes.

The embodiment of the splitter 15 set forth up to now, which reflects 38% of the light beam 1 and transmits 62% thereof, is therefore only one possibility for realizing the function of the splitter 15. Alternatively, the transmission values for the two passes can be differently designed with polarization-optical means. Another alternative, for example, is comprised therein in designing the splitter 15 such that it comprises a nearly complete transmission for the beam reflected at the reflection face 7 and comprises a transmission as well as reflection of respectively 50% for the optical beam 1 incoming from the entry face 3.

Figure 4:
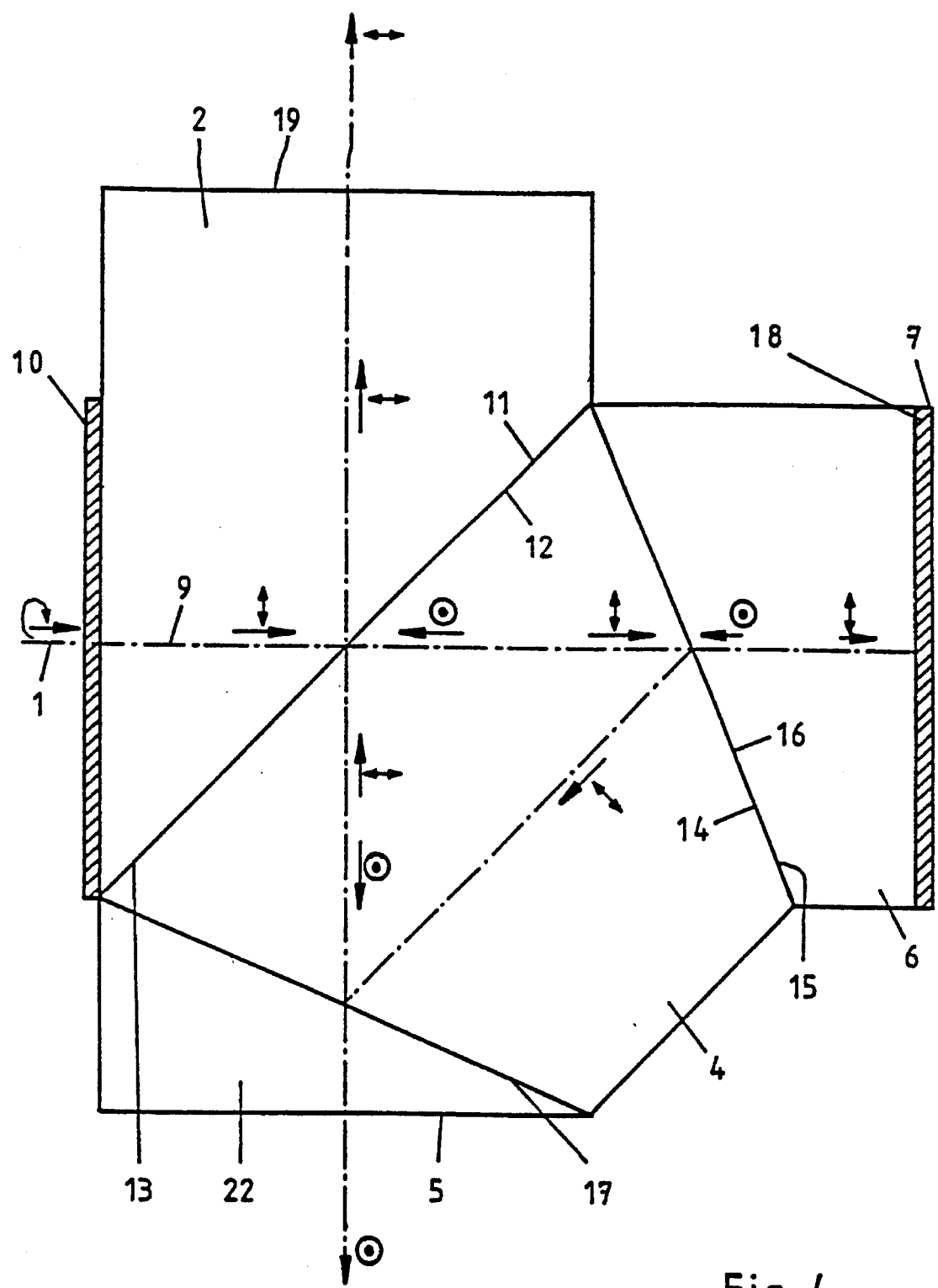
FIG. 4 is a plan view onto another beam splitter, whereby a wedge is arranged in the region of the exit prism and comprises exit faces arranged essentially perpendicularly relative to the respective exit direction.

In the embodiment of FIG. 4, the exit face 19 has an orientation that extends essentially parallel to the entry direction 8. A wedge 22 is arranged in the region of the splitter 17, this wedge leading to a parting of the exit face 5 from the splitter 17 and likewise orienting the exit face 5 essentially parallel to the entry direction 8. The exit faces 5, 19 in this arrangement are thus arranged exactly perpendicularly relative to the respective exit directions. What results therefrom is that a complete suppression of the angular wobble of the bearing is enabled.

Figure 5:
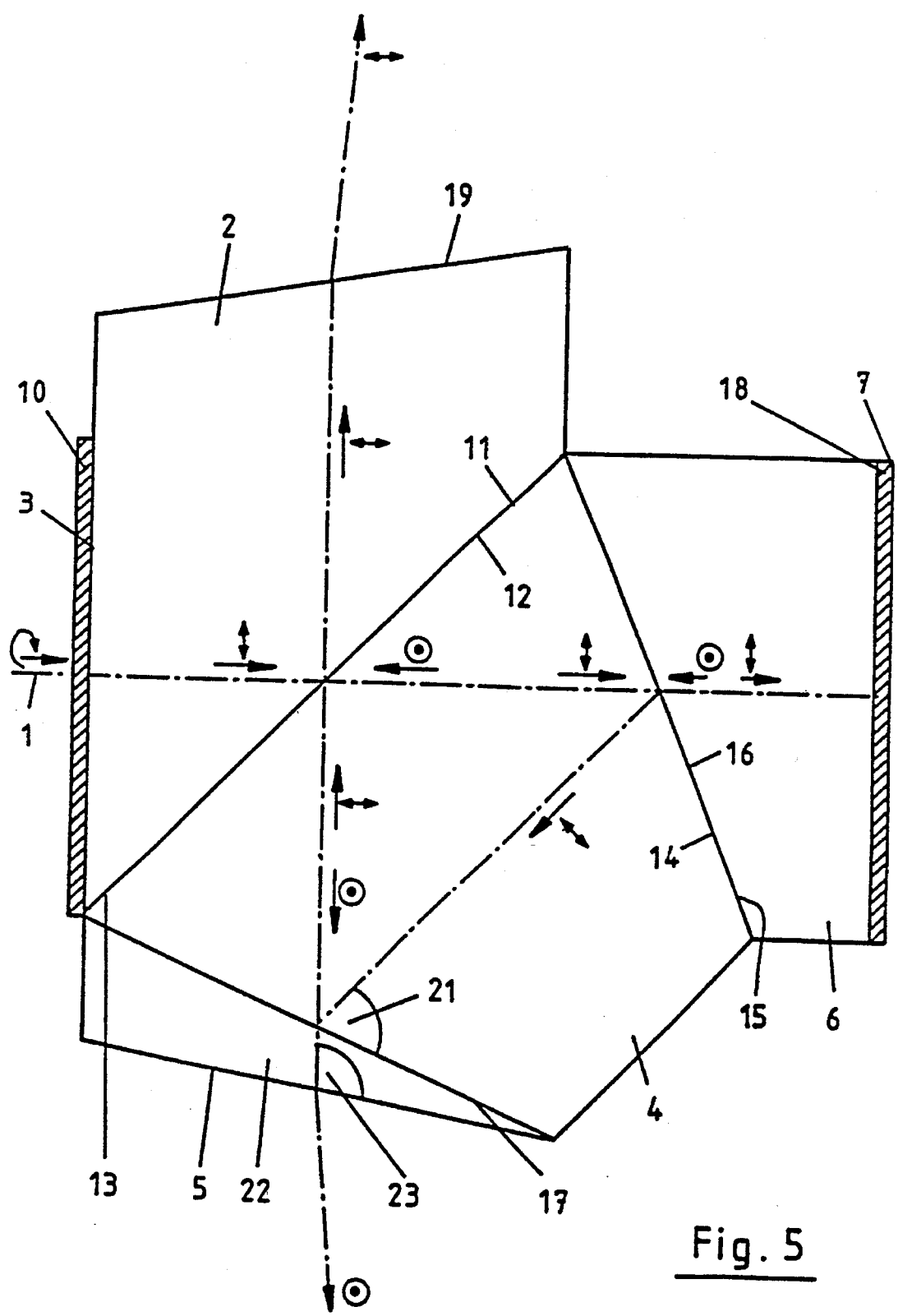
FIG. 5 is a plan view onto a beam splitter modified in comparison to the illustration in FIG. 4, whereby the exit faces have an inclination relative to the light entry direction.

A wedge 22 is likewise employed in the embodiment of FIG. 5, but the exit face 5 as well as the exit face 19 are oriented with an angle of approximately +10° or, respectively, −10° relative to the entry direction 8. This leads to the fact that an angle 23 has a value of approximately 100°. The sub-beams thereby depart the prism at an angle of approximately 95° relative to the entry direction 8. A reduction of the angular wobble of approximately 50:1 is realized on the basis of this embodiment. A correction of angular and integration errors of the prism can thus be advantageously implemented by tilting. The astigmatism is nonetheless reduced to such an extent that disturbing influences are largely avoided. Due to the deviation from an exit angle of 90°, reflections in the region of the recording material to be exposed are avoided. These reflections potentially proceed back into the exit faces 5, 19.

Figure 6:
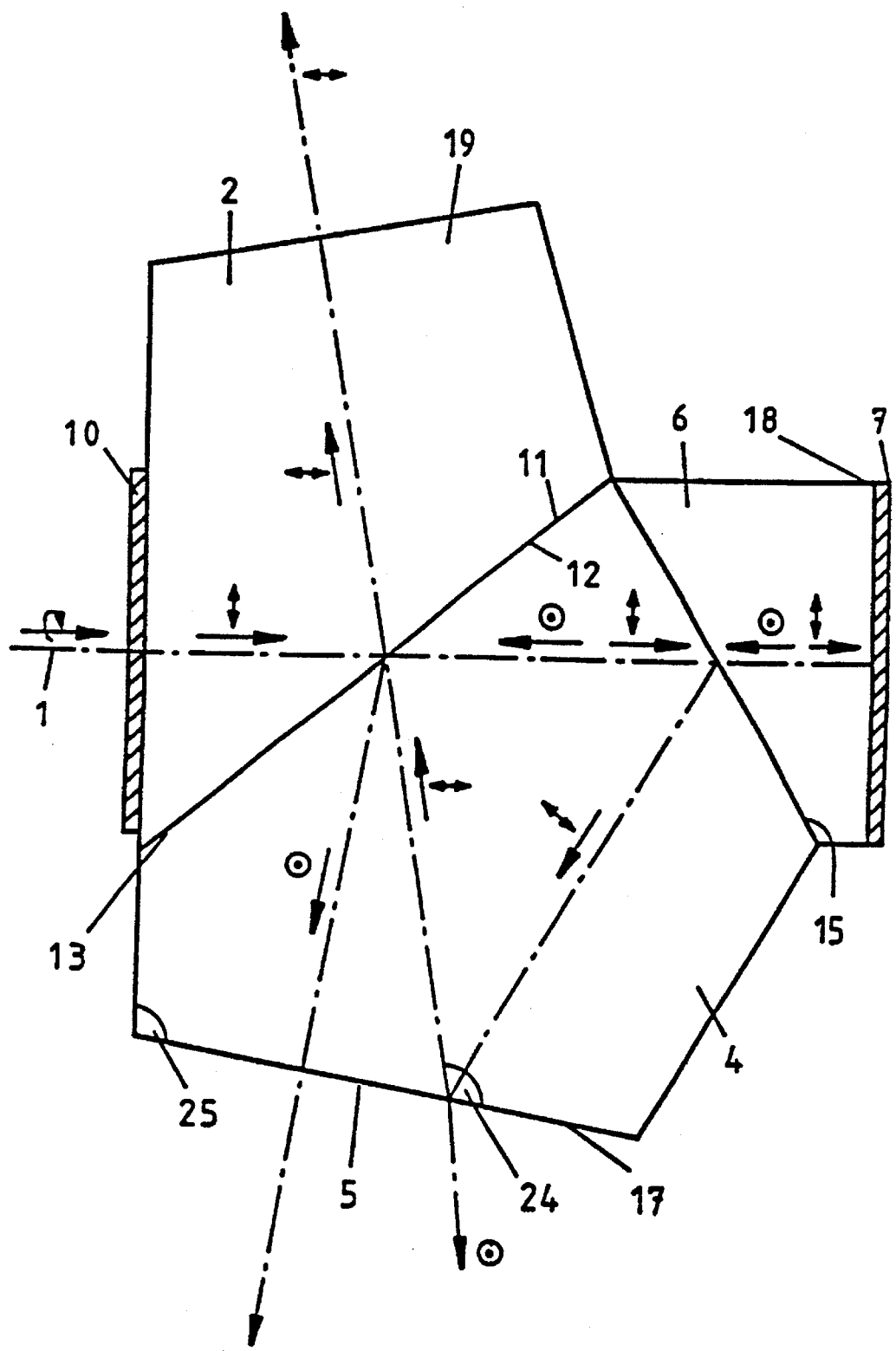
FIG. 6 is a plan view onto a further beam splitter, whereby the exit prism and the wedge are designed as one piece.

In the embodiment of FIG. 6, a variation of the angle of inclination of the splitters 13, 15, 17 occurs such that a one-piece embodiment of the exit prism 4 and of the wedge 22 is enabled. The exit face 5 and the splitter 17 thus again coincide in this embodiment. The varied angular positions make it possible that an essentially perpendicular orientation of the exit faces 5, 19 with respect to the respective exit directions is realized despite the inclined arrangement of the exit, faces 5, 19 relative to the entry direction 8. The angle 24 in this embodiment has a value of approximately 110° and the angle 25 comprises a value of approximately 100°. The splitter 13 is provided with an angle of inclination of −40° relative to the entry direction 8. The splitter 15 comprises an inclination of approximately 60° relative to the entry direction 8. This embodiment completely suppresses an angular wobble and also avoids reflections into the region of the prism.

The joining of the prisms 2, 4, 6 can occur, for example, by gluing. Given a designing of the circular-to-linear converters 10, 18 as λ/4 plates, a realization of calcite or quartz is expedient. Glass 10 or some other, suitable, transparent material can be employed as material for the prisms 2, 4, 6. The splitters 13, 15, 17 can be realized with dielectric layers or polarizing films. The splitter 15 can be composed of a metal.

In particular, the λ/4 plates can be provided with a crystalline structure. The speed of the light propagation in the region of crystals is dependent on the orientation of the crystal axes. The dependency on an orientation of the light components resulting therefrom leads to different transit times that can be utilized for the transformation of the circular polarization into a linear polarization. A transformation in reverse direction can likewise ensue. Instead of the λ/4 plates for circular-to-linear polarizations, differently designed phase transformations can also be fundamentally employed. For example, it is possible to provide a magneto-optical conversion upon utilization of the Farraday effect, or to provide an acousto-optical conversion.

The beam divider of the invention is particularly suitable for employment in inside drum recording means. Given designing of the inside drum with a circumferential angle of approximately 170°, the beam divider of the invention makes it possible to achieve an exploitation of approximately 340° of the rotational path.

However, it lies within the framework of the invention to utilize the beam divider in other systems as well, for example in F/Θ systems instead of a penta prism or Wollaston prism.

Although various minor changes and modifications might be proposed by those skilled in the art, it will be understood that I wish to include within the claims of the patent warranted hereon all such changes and modifications as reasonably come within my contribution to the art.

I claim:

1. A device for dividing an optical beam into first and second sub-beams, comprising:

a first prism having an entry face lying substantially perpendicular to an optical axis of an optical beam incident into the entry face, said first prism having a first exit face at which the first sub-beam exits;

a second prism adjoining the first prism at a first optical beam splitter, said second prism having a second exit face at which the second sub-beam exits;

a third prism adjoining the second prism at a second optical beam splitter, said third prism having a reflection face opposite the second splitter;

said second exit face having a third optical beam splitter thereat;

a first circular to linear optical beam converter at said entry face of said first prism;

said reflection face comprising a mirror aligned substantially perpendicular relative to said optical axis and having a second circular to linear optical beam converter thereat; and said entry face and first and second exit faces, first, second, and third optical beam splitters, and said mirror being geometrically positioned relative to one another and said optical axis such that said optical beam entering said entry face is split into said first and second sub-beams for exiting from opposite sides of said device and such that each sub-beam undergoes an even number of reflections.

2. A device according to claim 1 wherein a fourth prism in the shape of a wedge adjoins said second exit face at said third splitter and wherein said first and second sub-beams exit from the device in opposite directions.

3. A device according to claim 1 wherein the second beam splitter reflects a first part of the optical beam and transmits a second part of the optical beam during a first passage;

the transmitted second part of the optical beam is reflected back onto the second beam splitter by the reflection face mirror; and the second beam splitter transmitting a part of the reflected second part of the light beam during a second passage through the second beam splitter, said second beam splitter having its degree of transmission and degree of reflection selected such that the reflected first part of the optical beam and the transmitted part of the reflected second part of the optical beam have approximately a same optical power.

4. A device according to claim 1 wherein the first circular to linear converter converts the optical beam having a circular polarization entering the entry face into a linear repolarized optical beam;

said first and third beam splitters are polarization selective; and said second circular to linear converter turns a polarization direction of a portion of the optical beam passing through the second splitter by 90°.

5. A device according to claim 1 wherein said second beam splitter has a transmissivity of approximately 62% and a reflectivity of approximately 38%.

6. A device according to claim 1 wherein the second beam splitter has a reflectivity and a transmissivity of substantially 50% for the optical beam entering during a first passage and a transmissivity of substantially 100% for a portion of the light beam reflected from the reflection face mirror during a second passage through the second beam splitter.

7. A device according to claim 1 wherein the optical axis of the optical beam entering the entry face is also a rotational axis of the device.

8. A device according to claim 1 wherein the first and second circular to linear converters comprise λ/4 plates.

9. A device according to claim 1 wherein said first beam splitter has an inclination angle of −45° relative to said optical axis;

said second beam splitter has an inclination angle of approximately +67.5° relative to said optical axis; and said third beam splitter has an inclination angle of approximately +22.5° relative to said optical axis.

10. A device according to claim 1 wherein said first exit face for said first sub-beam has an inclination angle of −22.5° relative to said optical axis and said second exit face for said second sub-beam has an inclination angle of substantially +22.5° relative to said optical axis.

11. A device according to claim 1 wherein a wedge is provided as a fourth prism at said second exit face and wherein said first exit face is parallel with said optical axis and said wedge as said fourth prism has an exit face for said second sub-beam which is also parallel to said optical axis.

12. A device according to claim 1 wherein said first exit face for said first sub-beam has an inclination angle of substantially −10° relative to said optical axis; and said second exit face for said second sub-beam has an angle of substantially +10° relative to said optical axis.

13. A device according to claim 1 wherein said entry face, mirror, first, second, and third optical beam splitters, and first and second exit faces are geometrically arranged relative to one another such that an optical beam path of the first sub-beam and the second sub-beam are substantially of equal length, each of the first and second sub-beams undergoes a same, even number of reflections, and an intensity of the sub-beams is substantially equal.

14. A device for dividing an optical beam into first and second sub-beams, comprising:

a first prism having an entry face lying substantially perpendicular to an optical axis along which an optical beam incident into the entry face passes, and has a first exit face for the first sub-beam;

a second prism adjoining the first prism at a first beam splitter, and having a second exit face at which the second sub-beam exists;

a third prism adjoining the second prism at a second splitter, and having a reflection face;

said second face having a third splitter thereat;

a first circular to linear converter at said entry face of said first prism;

said reflection face comprising a mirror aligned substantially perpendicular relative to said optical axis; and said entry face, mirror, first and second exit faces, and first, second, and third beam splitters being geometrically arranged relative to one another such that said first and second sub-beams exit from said device at opposite sides of said optical axis.

15. A device according to claim 14 wherein said entry face, mirror, first and second exit faces, and first, second, and third beam splitters are geometrically arranged relative to one another such that an optical path length of the first and second sub-beams is substantially equal and each of the first and second sub-beams undergoes an even number of reflections.

16. A device according to claim 14 wherein said entry face, mirror, first and second exit faces, and first, second, and third beam splitters are geometrically arranged relative to one another and said first, second, and third beam splitters split beams incident thereon such that an intensity of the first and second subbeams exiting from the first and second exit faces are substantially equal.

17. A device according to claim 14 wherein said entry face, mirror, first and second exit faces, and first, second, and third beam splitters are geometrically arranged relative to one another such that said first and second sub-beams exit from said exit faces at exit points lying exactly opposite one another with respect to the optical axis of the device and an exit angle of each relative to the optical axis have the same magnitude.

18. A device for dividing an optical beam into first and second sub-beams, comprising:

a first prism having an entry face lying substantially perpendicular to an optical axis of an optical beam incident into the entry face, said prism having a first exit face at which the first sub-beam exists;

a second prism adjoining the first prism at a first optical beam splitter, said second prism having a second exit face at which the second sub-beam exits;

a third prism adjoining the second prism at a second optical beam splitter, said third prism having a reflection face opposite the second splitter;

said second exit face having a third optical beam splitter thereat;

said reflection face comprising a mirror aligned substantially perpendicular relative to said optical axis and having a circular to linear optical beam converter thereat; and said entry face and first and second exit faces, first, second, and third optical beam splitters, and said mirror being geometrically positioned relative to one another and said optical axis such that said optical beam entering said entry face is split into said first and second sub-beams for exiting from opposite sides of said device and such that each sub-beam undergoes an even number of reflections.

19. A device according to claim 18 wherein an additional circular to linear optical beam converter is provided at said entry face of said first prism and said device is adapted for rotation.

20. A device for dividing an optical beam into first and second sub-beams, comprising:

a first prism having an entry face lying substantially perpendicular to an optical axis of an optical beam incident into the entry face, said first prism having a first exit face at which the first sub-beam exits;

a second prism adjoining the first prism at a first optical beam splitter, said second prism having a second exit face at which the second sub-beam exits, and said first optical beam splitter being polarization selective;

a third prism adjoining the second prism at a second optical beam splitter, said third prism having a reflection face opposite the second splitter;

said second exit face having a third optical beam splitter thereat which iS polarization selective;

said reflection face comprising a mirror aligned substantially perpendicular relative to said optical axis and having a circular to linear optical beam converter thereat; and said entry face and first and second exit faces, first, second, and third optical beam splitters, and said mirror being geometrically positioned relative to one another and said optical axis such that said optical beam entering said entry face is split into said first and second sub-beams for exiting from opposite sides of said device and such that each sub-beam undergoes an even number of reflections.

* * * * *